March 6, 1956  R. H. BREEBACK  2,737,194
FLUID TRANSFER SYSTEM AND METHOD
Filed Dec. 13, 1951
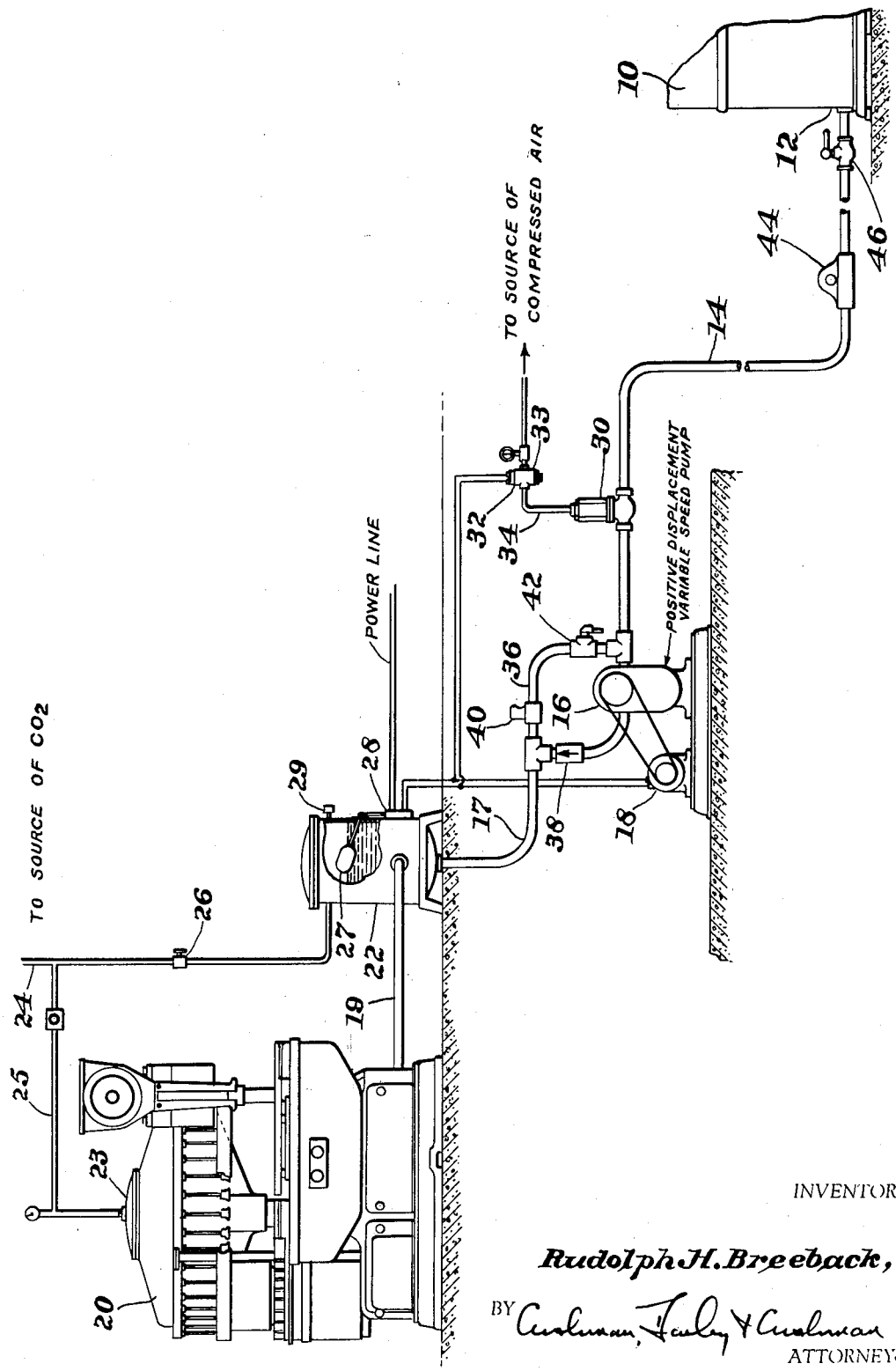
INVENTOR:
Rudolph H. Breeback,
BY Cushman, Darby & Cushman
ATTORNEYS.

United States Patent Office 2,737,194
Patented Mar. 6, 1956

2,737,194

FLUID TRANSFER SYSTEM AND METHOD

Rudolph H. Breeback, Baltimore, Md., assignor to Crown Cork & Seal Company, Inc., Baltimore, Md., a corporation of New York Application December 13, 1951, Serial No. 261,554

8 Claims. (Cl. 137—12.5)

The present invention relates to a filling system and, more particularly, to a system for delivering beer or other carbonated beverages to a filling machine.

An object of this invention is to the provision of a system for delivering beer to a filling machine from a storage tank such as a Government vat and regardless of the location of the storage tank. This invention provides for a system which will operate satisfactorily regardless of whether or not the storage tank is located above or below the filling machine and, consequently, the problem of a static head caused by locating a storage tank above the filling machine is eliminated.

A further object of this invention is the provision of a system of delivering beer to a filling machine whereby the pressure of the beer can be accurately controlled regardless of the volume or pressure of the beer in the storage tank. This provision eliminates undesirable foaming in the filling machine and, thence, an even flow of beer may be delivered to the bottles or cans from the filling machine.

Another object of this invention is the provision of a pump system for delivering beer to a filling machine and which system includes a positive displacement and variable speed pump. This allows the discharge volume of the system to be varied to suit existing operating conditions.

A still further object of the invention is the provision of means to protect the pump when the discharge pipe from the pump becomes clogged or closed when the pump is operating. This provision decreases the maintenance on the system and increases the life of the pump.

Other objects and advantages of the system will be apparent from the following specifications and accompanying drawing.

Referring specifically to the drawing, the system for supplying beer or any other carbonated beverages or liquids to a conventional filling machine has a storage tank 10 which is commonly known as the Government tank. The storage tank 10, which stores a large quantity of beer at a remote distance from the filling machine, has an outlet 12 to which is attached a pipe or conduit 14 for transferring the beer therefrom. The pipe or conduit 14 connects to the inlet side of a positive displacement variable speed pump 16. An electric motor 18 or the like is provided to drive the pump 16 at any speed desired when beer is required in the filling machine 20. A more detailed description of the operation of the pump will follow in the specification.

Located between the outlet of the pump 16 and the inlet of the filling machine 20 is a balance tank 22 which directly supplies beer on demand to a filling tank 23 of the filling machine. A discharge pipe or conduit 17 connects the outlet of the pump 16 with the inlet of the balance tank 22 and it is well to note that the inlet for the balance tank 22 is located beneath the surface of the beer in the balance tank and, consequently, the amount of foaming in the balance tank is reduced to a minimum. A pipe or conduit 19 supplies beer from the balance tank to the filling machine reservoir 23.

Reservoir 23 includes a float controlled valve of the type disclosed in the application of Carl L. Day and Rudolph H. Breeback for Filling Machine, Serial No. 248,722, filed September 28, 1951, now Patent No. 2,692,075, dated October 8, 1954. As is disclosed in said application, air or carbon dioxide gas is delivered to the filling reservoir by a line such as 25 connected to a carbon dioxide supply line such as 24 and the float within the filling reservoir 23 so controls the reservoir air and gas escape valve that the proper height of beer will be maintained within the reservoir and the pressure of air or gas in the reservoir above the beer will be constant. For example, the pressure of the air or gas above the beer may be of the order of seven pounds per square inch. The beer line 19 also opens to the lower wall of reservoir 23 as disclosed in said Day and Breeback application.

The balance tank 22 is preferably located near the filling machine 20. Since beer is supplied from the filling machine to the bottles or cans under a constant pressure, it is necessary that the balance tank 22 be under a constant pressure. Pressure will be supplied to the balance tank 22 through the pipe or conduit 24 connected to a source of carbon dioxide gas. A regulator 26 is provided in the pipe or conduit 24 to reduce the pressure delivered to balance tank 22 to a predetermined amount. Normally in a typical system of this type a constant pressure of the order of nine pounds per square inch should be maintained above the liquid in the balance tank. However, this pressure may be varied to suit existing operating conditions by adjustment of the regulator 26.

To maintain a predetermined amount of liquid in the balance tank 22 at all times during the filling operation, a float 27 is provided in the balance tank 22 to operate a switch 28. The switch 28, which may be a mercury type limit switch, will control the operation of the pump 16 in that it will control motor 18. When the beer in the balance tank 22 drops below a predetermined level, the float actuated switch 28 will close to complete a circuit to the motor 18 and thus actuate the pump 16. Beer is then pumped into the balance tank until the float actuated switch is opened to thereby stop the pump.

As beer is pumped into the balance tank 22, the pressure in the upper portion of the balance tank will increase. Because the pressure in the upper portion of the balance tank must be maintained constant, a relief valve 29 is provided to relieve the excess pressure caused by the incoming beer. Obviously, if the pressure in the balance tank is to be maintained at nine pounds, valve 29 will be adjusted accordingly.

To prevent flooding of the balance tank 22 when the pump 16 is inoperative, an air operated shut-off valve 30 is placed in the beer supply conduit 14 between the pump 16 and the government tank 10 if tank 10 is located above the balance tank. The air operated shut-off valve 30 is controlled by the solenoid 32 which is deenergized when the motor 18 is stopped. When the solenoid 32 is deenergized it will open a valve 33 and air under pressure will be supplied through the conduit 34 to close the air operated shut-off valve 30 and consequently beer cannot pass the pump 16 when it is inoperative.

In any system for supplying beer to a filling machine a condition may arise where the discharge pipe from the pump or the pipe leading into the filling machine may become clogged or closed. If this condition arises, the pump would be damaged and the system would become inoperative if means were not provided for protecting the pump. In order to protect the pump against such a condition, a by-pass 36 is provided between the outlet and the inlet side of the pump 16. Located in the by-pass is a safety valve 40 which is pressure operated and will open when the pressure in the pipe or conduits 17 and 19 increases excessively. A check valve 38 located on the outlet of the pump 16 allows beer to flow only toward the balance tank. If pipe 17 is inadvertently closed or "dead ended," pressure will build up in the pipe 17 and the safety valve 40 will open and the beer will return to the inlet side of the pump 16. In the meantime, appropriate measures may be taken by the operator to close down the system and make adequate repairs and consequently there will be no damage to the pump. A beer cock 42 is provided in the by-pass line so that it may be drained after the system is closed down.

A meter 44 is provided in the conduit 14 adjacent to the Government tank in order that the operator may have an indication of the number of gallons of beer pumped from the Government tank 10. Also, there is provided adjacent to the Government tank 10 in the conduit 14 a shut-off valve 46 which may be used to completely close down the system at the end of a working day or when the system is being transferred to a full storage tank.

The operation of the system is as follows: Assuming that the filling reservoir 23 is filled with beer to a predetermined level and with a body of gas above the beer at a pressure of the order of seven pounds per square inch, and also assuming that the balance tank contains beer to the desired level and with the pressure of the order of nine pounds per square inch in the upper portion of the balance tank, when the beer flows from the reservoir 23 to the bottles or to the containers being filled, the pressure within the balance tank will force beer through line 19 to reservoir 23, thereby replacing the beer flowed to the bottles. When the level of the beer in the balance tank 22 lowers sufficiently to cause float 27 to close switch 28, motor 18 will operate pump 16 to thereby supply additional beer to the balance tank. The resultant rise of level of the beer in the balance tank will increase the pressure in the upper portion of that tank, but assuming that the balance tank is operating at a pressure of nine pounds, pressure in excess of nine pounds will be relieved through valve 29. Conditions ordinarily will be so regulated that if the filling machine is operating at normal filling speed, pump 16 will be operating for 80 percent of any given period of filling machine operation.

The fact that a somewhat higher pressure is maintained in the balance tank than that maintained in the upper portion of the reservoir 23 will insure that beer will be forced upwardly into the filling machine reservoir from the balance tank 22. As has been indicated above, the pressure in the filling reservoir 23 will be maintained substantially constant by a float-controlled valve as described in said Day and Breeback application.

It will be observed that as is contemplated by the objects herein, the present system insures that the supply of beer to the filling reservoir 23 will be entirely independent of the pressure within the Government vat 10. The various other controls included in the system further insure such independence and also provide the necessary safety factors.

The terminology used in the specification is for the purpose of description and not of limitation, the scope of the invention being defined in the claims.

I claim:

1. A system for supplying a carbonated liquid to the reservoir of a filling machine comprising a storage tank for the carbonated liquid, a motor operated pump having its inlet connected to said storage tank, a balance tank for supplying liquid under pressure to said filling machine reservoir and located intermediate said pump and the filling machine reservoir, said balance tank including an inlet and outlet, an outlet of said pump connected to the inlet of said balance tank, the outlet of said balance tank being connected to the filling machine reservoir, a float operated switch in said balance tank for operating said motor operated pump when the liquid in said balance tank drops to a predetermined level, means for maintaining a constant pressure in said balance tank, said means including a relief valve carried by said balance tank which will relieve pressure above the liquid within said balance tank when said pressure exceeds a predetermined maximum and means to prevent leakage by said pump when said pump is inoperative, said last-mentioned means including an air operated shut-off valve responsive to said pump and intermediate of said tank and said pump whereby the flow of liquid to said pump is shut off when said pump is inoperative.

2. A system for supplying a carbonated liquid to the reservoir of a filling machine comprising a storage tank for the carbonated liquid, a motor operated pump having its inlet connected to said storage tank, a balance tank intermediate said pump and the filling machine reservoir and including an inlet and outlet, the outlet of said pump being connected to the inlet of said balance tank, the outlet of said balance tank being connected to the inlet of the filling machine reservoir, a float operated switch in said balance tank for energizing a circuit to operate said motor operated pump when the liquid in said balance tank drops to a predetermined level, and means to prevent leakage by said pump when said pump is inoperative, said means including an air operated shut-off valve intermediate of said tank and said pump, a solenoid normally energized when said pump is operating and deenergized when said pump is inoperative, a valve actuated by said solenoid when said solenoid is deenergized to supply air under pressure to said air operated shut-off valve shutting off the flow of liquid to said pump.

3. A filling system of the character described comprising a storage tank for a carbonated liquid, a filling machine having a reservoir for receiving the carbonated liquid from said storage tank and means for filling containers with carbonated liquid from said reservoir, said carbonated liquid in the reservoir of said filling machine being under a superposed body of gas at a predetermined constant pressure, a motor-operated pump having its inlet connected to said storage tank, a balance tank for supplying liquid under pressure to said filling machine reservoir and located intermediate said pump and the filling machine reservoir, said balance tank having a body of gas at a constant pressure above the liquid therein, the constant pressure of said body of gas being greater than the pressure of the gas above the liquid in the reservoir of said filling machine so that the liquid in the balance tank will flow to said filling machine reservoir, said balance tank having an inlet beneath the surface of the liquid therein and an outlet, the outlet of said pump being connected to the inlet of said balance tank, the outlet of said balance tank being connected to the inlet of the filling machine reservoir, and a float operated switch mounted in said balance tank for operating said motor operated pump when the liquid in said balance tank drops to a predetermined level.

4. A system of the character described in claim 3 including means to prevent leakage by said pump when said pump is inoperative, said means including an air operated shut-off valve responsive to the operation of said pump and intermediate of said tank and said pump which shuts off the flow of liquid to said pump when said pump is inoperative.

5. A system of the character described comprising a storage tank for a carbonated liquid, a filling machine having a reservoir therein for receiving the carbonated liquid from said storage tank and mean for filling containers with carbonated liquid from said reservoir, said carbonated liquid in the reservoir of said filling machine being under a superposed body of gas at a predetermined constant pressure higher than atmosphere, a motor-operated pump having its inlet connected to said storage tank, a balance tank for supplying liquid under pressure to the filling machine reservoir and located intermediate of said pump and said filling machine reservoir, said balance tank having a body of gas at a constant pressure above the liquid therein, the pressure of said body of gas above the liquid in said balance tank being greater than the pressure of the body of gas in the filling machine reservoir so that liquid in said balance tank will flow to said filling machine reservoir, said balance tank including an inlet beneath the surface of the liquid therein and an outlet, an outlet of said pump connected to the inlet of said balance tank, the outlet of said balance tank being connected to the filling machine reservoir, a float-operated switch in said balance tank for operating said motor-operated pump when the liquid in said balance tank drops to a predetermined level, and means for maintaining a substantially constant pressure in said balance tank, said means including a relief valve carried by said balance tank which will relieve pressure above the liquid within said balance tank when said pressure exceeds a predetermined maximum.

6. A method of supplying a carbonated liquid from a storage tank to a balance tank and then to a filling machine reservoir comprising maintaining gas in the filling machine reservoir at a predetermined constant pressure, maintaining gas in the balance tank at a predetermined constant pressure higher than the pressure of gas in the filling machine reservoir, flowing the carbonated liquid from the storage tank to the balance tank, controlling the flow of liquid from the storage tank to the balance tank in response to the level of liquid in the balance tank, and utilizing the differential pressure between the balance tank and the reservoir to cause flow of carbonated liquid from the balance tank to the filling machine reservoir.

7. A method of transferring a carbonated liquid from a storage tank through a balance tank, through a filling machine and to containers to be filled comprising maintaining gas in the filling machine reservoir at a predetermined constant pressure, maintaining gas in the balance tank at a predetermined constant pressure higher than the pressure of gas in the filling machine reservoir, flowing the carbonated liquid from the storage tank into the balance tank beneath the level of carbonated liquid therein, controlling the flow of liquid from the storage tank to the balance tank in response to the level of liquid in the balance tank, flowing the carbonated liquid from the balance tank to the filling machine reservoir upon demand, and utilizing the differential pressure between the balance tank and filling machine reservoir to cause flow of the carbonated liquid from the balance tank to the filling machine reservoir.

8. A method of transferring a carbonated liquid from a storage tank through a balance tank, through a filling machine reservoir to containers to be filled comprising maintaining gas in the filling machine reservoir above the carbonated liquid therein at a predetermined constant pressure above atmosphere, maintaining gas in the balance tank above the carbonated liquid therein at a constant pressure higher than pressure of gas in the filling machine reservoir, flowing the carbonated liquid by pumping action from the storage tank to the balance tank, controlling the pumping action in response to the level of liquid in the balance tank, positively shutting off flow of carbonated liquid from the storage tank to the balance tank in response to the pumping action, flowing the carbonated liquid from the balance tank to the filling machine reservoir upon demand, and utilizing the differential pressure between the balance tank and filling machine reservoir to cause the flow of carbonated liquid from the balance tank to the filling machine reservoir.

References Cited in the file of this patent

UNITED STATES PATENTS

| | | |
|---|---|---|
| 1,382,735 | McAulay et al. | June 28, 1921 |
| 1,491,989 | Kettering | Apr. 29, 1924 |
| 1,914,541 | Teesdale | June 20, 1933 |
| 2,049,851 | Madan | Aug. 4, 1936 |
| 2,140,187 | Kantor | Dec. 13, 1938 |
| 2,160,062 | Drake et al. | May 30, 1939 |